Figure 1:
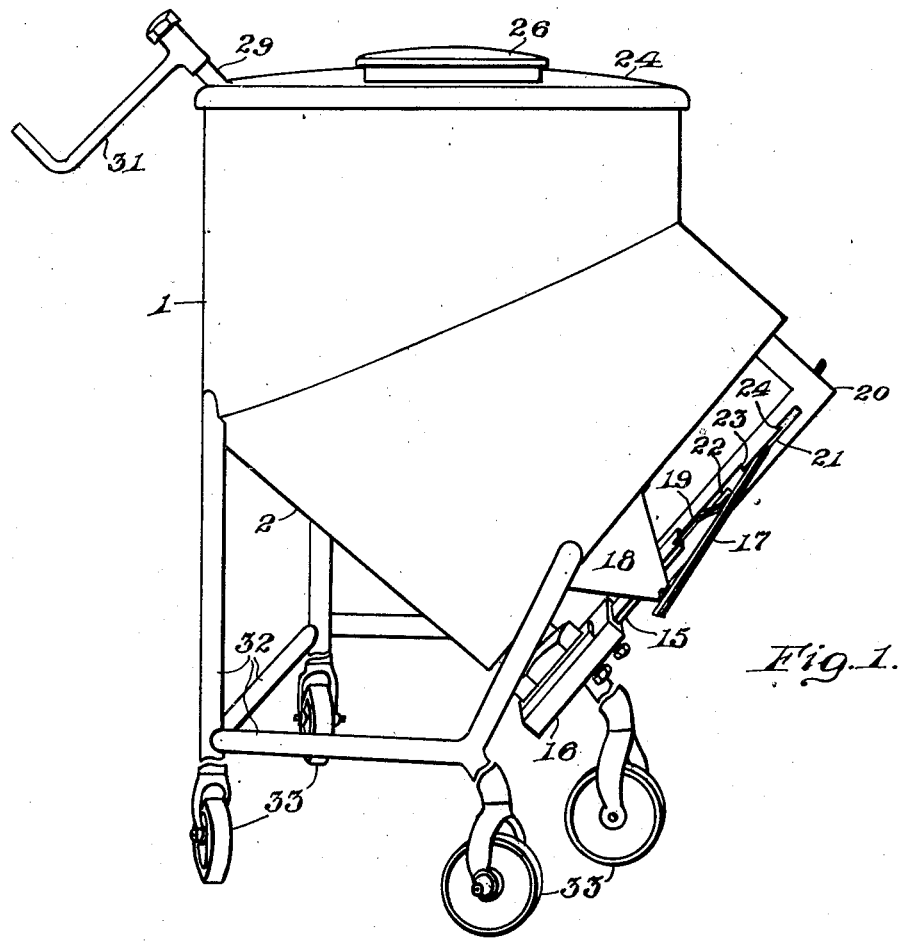

Jan. 3, 1950     R. KENNEDY, JR     2,493,249
FRUIT MIXING TANK

Filed Dec. 8, 1945     2 Sheets-Sheet 1

Inventor,
Ridgway Kennedy.
by J. Stuart Freeman,
Attorney.

Jan. 3, 1950 R. KENNEDY, JR 2,493,249
FRUIT MIXING TANK
Filed Dec. 8, 1945 2 Sheets-Sheet 2

Inventor,
Ridgway Kennedy
by J. Stuart Freeman,
Attorney.

Patented Jan. 3, 1950

2,493,249

UNITED STATES PATENT OFFICE 2,493,249

FRUIT MIXING TANK

Ridgway Kennedy, Jr., Drexel Hill, Pa., assignor to Abbotts Dairies, Incorporated, Philadelphia, Pa., a corporation of Maryland Application December 8, 1945, Serial No. 633,595

6 Claims. (Cl. 259—106)

The object of the invention is to provide improvements in mixing devices, but more particularly in devices of this class such as are especially adapted for the mixing of fruit juices, sugar and/or other ingredients for use in the making of ice cream and ices.

Fruits and berries, hereinafter referred to by the term fruits, that are packed and frozen for use in ice cream, sherbets and ices, as well as in bakery products, jellies and jams, are usually mixed with 20 to 25 percent of sugar before freezing. They are then stored at sub-zero temperatures until time for use. This preserves their natural fresh flavor and color. In making ice cream, sherbets and ices, it is desirable to have small and medium sized pieces of the fruit evenly distributed throughout the product to increase the eye-appeal, but at the same time to insure the sweetened juice of the particular fruit or fruits thoroughly mixed throughout the frozen products in order to uniformly impart to them their identifying flavors.

When the fruits are taken from the sub-zero storage temperature and defrosted, the juice separates from the fruit and sinks to the bottom of the container, while the fruit itself rises to the top. It is frequently desirable at this stage to add more sugar to some fruits, in which case it is necessary to keep their mass gently stirred until the added sugar is thoroughly dissolved, as otherwise it will settle to the bottom in a thick layer. An object of the invention, therefore, is to provide a means for stirring the sugar into the fruit and/or berry mixture without unduly tearing the fruit into very small pieces. The outside of the stirring device completely encircles the circumference and bottom of the tank with each revolution of the stirrer, without depending upon the top closure in any way, and the sugar is thereby prevented from collecting undissolved upon the tank's bottom.

Another object is to keep the pieces of fruit and their juices mixed together, while the entire mass is being drained from the bottom into the subsequent straining operation. If this is not done, all of the juice would drain out first, and the remainder of the fruit pulp would not pass through the outlet and piping into the straining device.

A further object in designing the improved mixer is to place the outlet in a convenient position at one side of the bottom, so that the operator can readily make the piping connections to it for draining the product into a separate strainer.

Still another object is to provide 45° angles between the axis of the stirring mechanism and the bottom and lower side wall surfaces, as experience has established the fact that this angle is necessary, in order first to thoroughly agitate the contents when dissolving the sugar, and likewise in order to complete the emptying of the fruit particles, and thus avoid waste of the material that would otherwise cling to the sides, if a different angle were employed.

A still further object is to provide a leg and castor construction that enables the device to be readily removed from one location and shifted to another, where it can be connected to a straining device, or located over a hopper from which the contents are fed into a fruit feeder that injects the fruit directly into the stream of ice cream, sherbet, or ice, while still in liquid form after it is discharged from the ice cream freezer, and before it is filled into the container and hardened.

And a still further object is to provide in such a device means whereby the moisture condensed upon the cold outer side of the tank, as when filled with defrosted fruit, can be prevented from dropping into the hopper and upon the fruit therein, since moisture condensed from the air contains objectionable bacteria and molds.

Another object is to provide in a device of this character a construction that is extremely sanitary in its construction, its operation and the ease with which it can be thoroughly cleaned and sterilized, and maintained in such condition while not in use.

A further object is to provide a device of this class, comprising a tank open at its top, a diagonally extending shaft carrying paddles and rotatably mounted within said tank, and having a crank connection extending freely therefrom, a closure for the top of said tank preferably provided with an aperture having its own smaller closure, a bearing for the upper end of said shaft adjacent to one side of said top opening from which said crank connection extends freely, a bearing for the lower end of said shaft fixedly positioned in the diametrically lower portion of said tank, and a sleeve carried by said top closure and surrounding said shaft, without affecting the support and operation of the stirrer elements which are mounted independently of said closure, whereby said top closure is removable from said tank in a diagonal direction in alignment with the axis of said shaft.

Still another object is to provide a device of this character, in which said shaft is provided with a pair of scrapers, each of which has a leg that at one point in its rotary path is parallel with the vertical cylindrical section of the tank, the free end portions of said scrapers being connected to said shaft by preferably aligned portions, so that the two scrapers together form a substantial triangle. In addition thereto, said shaft also carries a pair of propeller-like agitators, the adjacent ends of said last-mentioned blades being connected together by a third section, which parallels in slightly spaced relation the walls of an angularly directed cylindrical extension of said tank.

And a still further object is to provide said top closure with a U-shaped handle comprising a pair of parallel side portions, which are surrounded by apertured extensions of said smaller closure, so that said handle serves as an attaching means and guide for said smaller closure.

Figure 4:
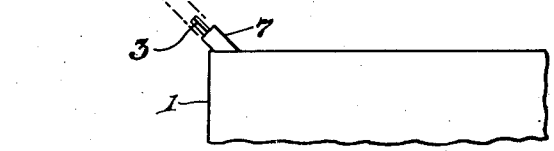
Figure 6:
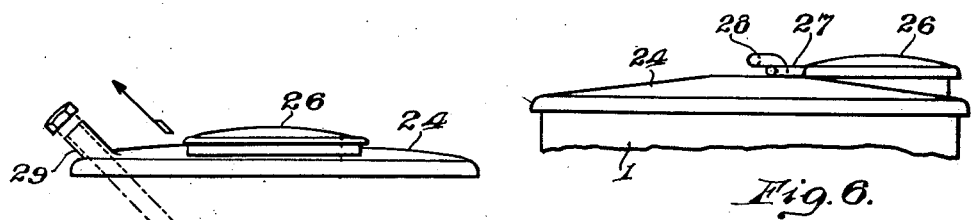
Figure 3:
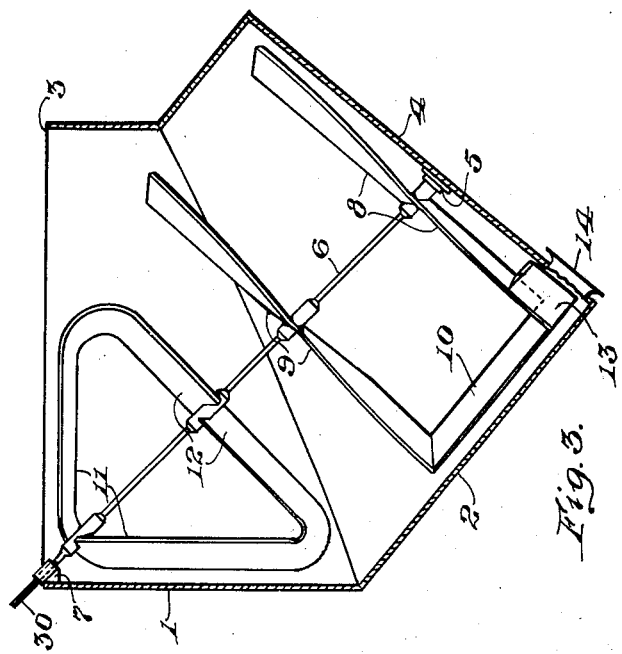
Figure 2:
Figure 2:
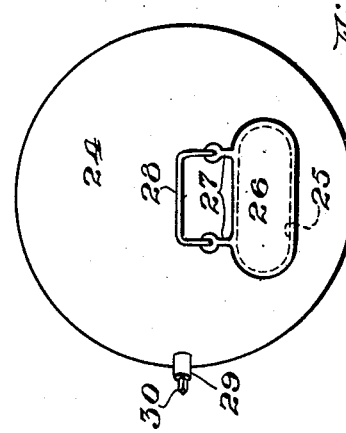
Figure 5:
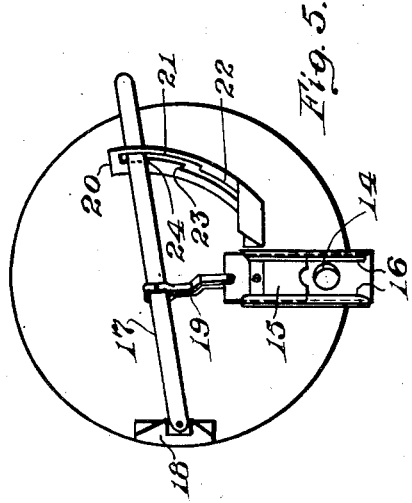

With the objects of the invention thus briefly set forth, the invention comprises further details of construction and operation, which are hereinafter fully brought out in the following specification, when read in conjunction with the accompanying drawings, in which Fig. 1 is a perspective view showing one embodiment of the invention; Fig. 2 is a top plan view of the upper closure and the smaller closure carried thereby; Fig. 3 is a vertical section through the tank alone, and showing the shaft and stirring elements operatively positioned therein; Fig. 4 is a fragmentary side elevational view of the upper portion of the tank with the top closure thereof removed in a diagonal direction; Fig. 5 is a perspective view of the lower discharge face of the device; and Fig. 6 is a fragmentary view showing the handle mounting of the smaller closure.

Referring to the drawings, one embodiment of the invention comprises a vertically cylindrical tank 1, having a diagonally downwardly projecting cylindrical extension 2, said tank being open at the top 3 and closed downwardly by an obliquely extending wall 4, which spans the lower end of said diagonal extension. Said wall is provided centrally with a fixed bearing 5 on which rotates one end of a shaft 6, that is substantially coaxial with diagonal extension, and adjacent to its upper end preferably rests rotatably within any suitable form of bearing 7, from which it can be lifted at will when the device is to be cleaned.

Said shaft is provided adjacent to its lower end with a pair of oppositely positioned, radially extending stirrer blades 8, and spaced therefrom nearly midway of the length of said shaft with a second pair of similarly arranged blades 9, the outer end of one blade of each of each pair being connected to the other by a scraper element 10, which in rotating with said blade supports may lightly skim the surface of said diagonal tank section, or may be in spaced relation but substantially parallel therewith, as illustrated.

The upper portion of said shaft is provided with a pair of angularly related, oppositely extending stirrer blades 11 that through the lower half of their path of rotation are substantially parallel with the cylindrical side wall of the upper of said tank sections. The outer free ends of these last-mentioned blades are connected to said shaft for the sake of rigidity, by means of a third set of propeller blade sections 12 that are in substantial alignment with each other, all of said blade sections being angularly arranged so as to effect a maximum degree of stirring of the contents of said tank. When cleaning of said shaft and blades is desired, they are lifted as a unit from within said tank, thereby leaving the tank interior free of all obstructions. It will be noted that the lower stirrer blade that is connected to the scraper element 10 is provided with an extension 13, which serves in its lowermost position to regulate the flow of the tank's contents from the outlet 14 when the maximum flow is not desired.

The lowermost portion of said end wall 4 is provided with a discharge opening 14 above referred to, which may be opened and closed at will from the outside by means of a simple slide valve 15, movable between guides 16 and actuated by a lever 17, that is pivotally attached to said end wall by means of a bracket 18, and is connected to said valve by means of a link 19, the position of said lever and said valve being maintained by means of a slotted arcuate plate 20, having two slot sections 21 and 22, which are slightly out of alignment to provide a shoulder 23, which when engaged by said lever insures said valve being in closed position, while an upper shoulder 24 may, if desired, be provided in the upper slot section 21 for securing said lever and valve in open position.

The top of said tank in provided with a removable closure or lid 24, which has a charging aperture 25, normally spanned by a closure 26. Said last-named closure is provided with a pair of spaced arms 27, having apertures in their free end portions through which extend the downwardly terminating ends of a U-shaped handle bar 28, carried by said first-named closure, and by which said first-named closure and said second closure with it are lifted. Ordinarily the large closure is kept in closed position during a day's run, and the smaller closure is opened for filling the tank with fruit and possibly other ice cream ingredients, thereby minimizing the extent to which the interior of the tank and its contents are exposed to the outside air and to dust and bacteria contamination. However, when the tank is empty and to be cleaned, the larger closure is lifted bodily from the tank, thereby exposing its entire interior and permitting free access thereto.

Said larger closure is provided adjacent to its periphery with a diagonally upwardly extending tubular projection, that slidably surrounds the upper end portion of said shaft, so as to thereby provide a further seal against the ingress of foreign matter of any sort, while the tank mixer is in use and contains edible substances. From said tubular extension the polygonally shaped end portion 30 of said shaft extends freely, and normally carries a suitably shaped, manually operable crank 31. Removal of said larger closure from said tank is effected in the direction of the arrow in Fig. 4, while restoration of said closure to said tank is effected by movement in the opposite direction.

The mixing tank as a whole may be supported in any suitable manner, but for portability is mounted upon a frame 32 (Fig. 1), that in turn is supported by any desired number of casters 33, while said tank may be mounted in operative position upon a fixed support, if preferred. However, such details and many others are merely questions of what ever may be preferred by the particular manufacturers and users of the device, and have no effect upon the principles of operation involved. Preferably the legs and casters are so arranged as to provide for the tanks being moved over a hopper in the floor, into which the fruit can be emptied, and from it fed into a fruit injector located on a lower floor, or at some other lower elevation. For strengthening the rigidity of the legs, and at the same time providing a trough to catch the condensation from the lowest point on the exterior of the tank, there may be provided a transversely V-shaped brace, operative to carry liquids beyond the opening of the hopper, where the fruit is being emptied into it from said mixer.

Having thus described my invention, what I claim and desire to protect by Letters Patent of the United States is:

1. A mixing device, comprising a chamber composed of an upwardly extending cylindrical section and a diagonal lower cylindrical section comprising an extension of said first section, said diagonal section being closed by an end wall, a rotatable shaft substantially coaxial with said diagonal section and extending angularly through said upper section, a paddle carried by said shaft and rotatable with respect to and adjacent the cylindrical wall of said lower diagonal section, and an angularly directed paddle carried by the upper portion of said shaft and at one point in its path being in parallel relation with one side of the wall of said upper section.

2. A mixing device, comprising a chamber composed of an upwardly extending cylindrical section and a diagonal lower section comprising an extension of said first section, said diagonal section being closed by an end wall, a rotatable shaft substantially coaxial with said diagonal section and extending angularly through said upper section, a bearing for the lower end of said shaft carried by said end wall, a second bearing for the upper section of said shaft carried by and adjacent to the periphery of said upper section, a paddle carried by said shaft and rotatable with respect to and adjacent the cylindrical wall of said lower diagonal section, and a triangularly shaped paddle carried by the upper portion of said shaft and comprising two sections that alternately in their common path of movement are in parallel relation with one side of the wall of the upper section.

3. A mixing device, comprising a chamber composed of an upwardly extending cylindrical section and a diagonal lower section comprising an extension of said first section, said diagonal section being closed by an end wall, a rotatable shaft substantially coaxial with said diagonal section and extending angularly through said upper section, a pair of angularly related blades carried by the upper portion of said shaft and when rotated generating a cone, one element of which cone is substantially parallel with an element of the cylindrical wall of said supper section, one section of each of said blades being at the same angle with respect to said shaft as said shaft is to that part of the tank wall where said shaft intersects said wall, and a pair of aligned propeller-like blades carried by the lower portion of said shaft and rotatable in a plane parallel with said end wall.

4. A mixing device, comprising an upwardly extending cylindrical section and a diagonal lower section comprising an extension of said first section, said diagonal section being closed by an end wall, a rotatable shaft substantially coaxial with said diagonal section and extending angularly through said upper section, a pair of angularly related blades carried by the upper portion of said shaft and when rotated generating a cone, one element of which cone is substantially parallel with an element of the cylindrical wall of said upper section, one section of each of said blades being at the same angle with respect to said shaft as said shaft is to that part of the tank wall where said shaft intersects said wall, a pair of aligned propeller-like blades carried by the lower portion of said shaft and rotatable in a plane parallel with said end wall, a second pair of aligned blades carried by said shaft in spaced relation with said first pair, and a scraper blade connecting the outer ends of two of the said pairs of aligned blades.

5. A mixing device, comprising an upwardly extending cylindrical section and a diagonal lower section comprising an extension of said first section, said diagonal section being closed by an end wall having a discharge outlet, a rotatable shaft substantially coaxial with said diagonal section and extending angularly through said upper section, a pair of angularly related blades carried by the upper portion of said shaft and when rotated generating a cone, one element of which cone is substantially parallel with an element of the cylindrical wall of said upper section, one section of each of said blades being at the same angle with respect to said shaft as said shaft is to that part of the tank wall where said shaft intersects said wall, a pair of aligned propeller-like blades carried by the lower portion of said shaft and rotatable in a plane parallel with said end wall, and an extension of one of said aligned blades to regulate the flow of the tank contents through said outlet, as said extension is maintained adjacent to its lowermost position.

6. A mixing device, comprising an upwardly extending cylindrical section and a diagonal lower section comprising an extension of said first section, said diagonal section being closed by an end wall, a rotatable shaft substantially coaxial with said diagonal section and extending angularly through said upper section, a bearing for the lower end of said shaft carried by said end wall, a second bearing for the upper section of said shaft carried by and adjacent to the periphery of said upper section, a pair of angularly related blades carried by the upper portion of said shaft and when rotated generating a cone, one element of which cone is substantially parallel with an element of the cylindrical wall of said upper section, one section of each of said blades being at the same angle with respect to said shaft as said shaft is to that part of the tank wall where said shaft intersects said wall, a pair of aligned propeller-like blades carried by the lower portion of said shaft and rotatable in a plane parallel with said end wall, a second pair of aligned blades carried by said shaft in spaced relation with said first pair, and a scraper blade connecting the outer ends of two of the said pairs of aligned blades.

RIDGWAY KENNEDY, Jr.

REFERENCES CITED

The following references are of record in the file of this patent:

UNITED STATES PATENTS

| Number | Name | Date |
|---|---|---|
| 43,040 | Porter | June 7, 1864 |
| 85,447 | Hunt | Dec. 29, 1868 |
| 814,993 | Thompson | Mar. 13, 1906 |
| 1,137,037 | Warner | Apr. 27, 1915 |
| 1,470,882 | Sauer | Oct. 16, 1923 |
| 1,863,515 | Weckbaugh et al. | June 14, 1932 |
| 2,188,551 | Kaltenbach et al. | Jan. 30, 1940 |